(12) United States Patent
Miltner et al.

(10) Patent No.: US 8,691,905 B2
(45) Date of Patent: Apr. 8, 2014

(54) POLYAMIDE COMPOSITIONS COMPRISING A SUBSTANCE COMPRISING ALKYLENE OXIDE MOIETIES

(75) Inventors: Hans Edouard Miltner, Rhode-St-Genese (BE); Vito Leo, Glimes (BE); Kermit S. Kwan, Cumming, GA (US)

(73) Assignee: Solvay SA, Brussels (BE)

( * ) Notice: Subject to any disclaimer, the term of this patent is extended or adjusted under 35 U.S.C. 154(b) by 0 days.

(21) Appl. No.: 13/635,474

(22) PCT Filed: Mar. 23, 2011

(86) PCT No.: PCT/EP2011/054501
§ 371 (c)(1),
(2), (4) Date: Sep. 17, 2012

(87) PCT Pub. No.: WO2011/117326
PCT Pub. Date: Sep. 29, 2011

(65) Prior Publication Data
US 2013/0018136 A1 Jan. 17, 2013

Related U.S. Application Data

(60) Provisional application No. 61/316,674, filed on Mar. 23, 2010.

(30) Foreign Application Priority Data

Mar. 23, 2010 (IN) .............................. 776/CHE/2010

(51) Int. Cl.
*C08K 5/06* (2006.01)
(52) U.S. Cl.
USPC ........................................................ 524/377
(58) Field of Classification Search
USPC ........................................................ 524/377
See application file for complete search history.

(56) References Cited

FOREIGN PATENT DOCUMENTS

| JP | 2006131890 A | 5/2006 |
| JP | 2008087349 A | 4/2008 |
| WO | WO 2011117325 A2 | 9/2011 |

OTHER PUBLICATIONS

Endo, Masahiro, et al—"Miscibility in Binary Blends of Aromatic and Alicyclic Polyamides"—2006, Journal of Applied Polymer Science, vol. 101, Issue No. 6, pp. 3971-3978; 8 pgs.
ASTM D-638—Standard Test Method for Tensile Properties of Plastics, 2010, ASTM International; 16 pgs.
Plastics Additives Handbook, 5th Edition by H. Zweifel, 2001, Chapter: Fillers and Reinforcements/Coupling Agents, Characterization of Fillers, Paragraphs 17.4.2, "Platy Fillers"; 17.4.3.2, "Whiskers"; and 17.4.3.3, "Glass Fibers (chopped strand)" , pp. 926 to 931, Hanser Publishers, Munich; 8 pgs.
Otsu, Nobuyuki—"A Threshold Selection Method from Gray-Level Histograms", 1979, IEEE Transactions on Systems, Man, and Cybernetics, vol. SMC-9, Issue No. 1, pp. 62-66; 5 pgs.
Additives for Plastics Handbook, 2nd Edition, Edited by John Murphy, 2001, Chapter: Modifying Specific Properties: Mechanical Properties-Reinforcements, Paragraph 5.2.3, "Glass fibre", pp. 43-48, Elsevier Advanced Technology, 8 pgs.
Boehm, Hanns-Peter, et al—"Nomenclature and Terminology of Graphite Intercalation Compounds", 1994, Pure & Appl. Chem., vol. 66, Issue No. 9, pp. 1893-1901; 9 pgs.
Brumfiel, Geoff—"Nanotubes cut to ribbons: New techniques open up carbon tubes to create ribbons", Published online Apr. 15, 2009; Nature, 3 pgs.
Choucair, M., et al—"Gram-scale production of graphene based on solvothermal synthesis and sonication", 2009, Nature Nanotechnology, vol. 4, pp. 30-33 and Supplementary Information pp. 1-19; 23 pgs.
NNB EN International Standard ISO 527-2—"Plastics—determination of tensile properties—Part 2: Test conditions for moulding and extrusion plastics", 2012; 22 pgs. Includes translation in English.
U.S. Appl. No. 13/635,469, Hans Edouard Miltner, et al.

*Primary Examiner* — Peter Szekely

(57) ABSTRACT

A polymer composition comprising two polyamides and a substance comprising alkylene oxide moieties. At least one of the polyamides in the composition may be a semi-aromatic polyamide, of which more than 50 mole % of the recurring units are obtainable by a polycondensation reaction between at least one non-aromatic diacid or derivative thereof and at least one aromatic diamine.

20 Claims, No Drawings

POLYAMIDE COMPOSITIONS COMPRISING A SUBSTANCE COMPRISING ALKYLENE OXIDE MOIETIES

CROSS-REFERENCE TO RELATED APPLICATIONS

This application is a U.S. national stage entry under 35 U.S.C. 371 of International Application No. PCT/EP2011/054501 filed Mar. 23, 2011, which claims priority to U.S. provisional application No. 61/316,674 filed on Mar. 23, 2010, and to Indian provisional application No. 776/CHE/2010 also filed on Mar. 23, 2010, the whole content of each of these applications being incorporated herein by reference for all purposes.

The present invention relates to polymer compositions comprising two different polyamides, at least one of which being a semi-aromatic polyamide and a substance comprising alkylene oxide moieties.

Semi-aromatic polyamides (like those derived from aromatic diamines and aliphatic diacids) are polymers having excellent mechanical, physical and chemical properties which make them useful for a variety of applications.

High performance polyarylamides commercialized under the trade name IXEF® by Solvay Advanced Polymers, L.L.C. are also proposed for the manufacture of products for healthcare, like medical devices.

These semi-aromatic polyamides are highly rigid polymers displaying high modulus and strength but the overall product spectrum is not fully satisfactory.

Polyarylamides also show a relatively high brittleness and low toughness which limits or even excludes their use in certain applications for which such polyarylamides would be ideal in view of their other properties.

JP-A 2006/131890 and JP-A 2008/087349 disclose blends of semiaromatic polyamides, aliphatic polyamides and an elastomer composition comprising polyamide hard segments and alkylene oxide soft segments. The compositions are said to have good antistatic and transparency properties.

Endo et al., J. Appl. Pol. Sci. Vol. 101, 3971 (2006) is related to the miscibility in binary blends of aromatic and alicyclic polyamides.

It was thus an object of the instant invention to provide compositions based on semi-aromatic polyamides having an improved property profile compared to the known products of this class.

In particular it was an object of the invention to improve ductility, elongation at break or impact resistance while preferably preserving strength and modulus.

This object has been achieved with polymer compositions in accordance with independent claims 1 and 2. Preferred compositions in accordance with the instant invention are set forth in the dependent claims and in the detailed description and examples hereinafter.

The compositions in accordance with the instant inventions comprise at least one semi-aromatic polyamide comprising recurring units obtainable by the polycondensation reaction between at least one non-aromatic diacid or derivative thereof and at least one aromatic diamine or the polycondensation reaction of at least one aromatic diacid and at least one non-aromatic diamine.

A diacid (or derivative thereof) or a diamine is considered for the purpose of this invention as "aromatic" when it comprises one or more than one aromatic group. A diacid (or derivative thereof) or a diamine or an amino-carboxylic acid (or derivative thereof) is considered for the purpose of this invention as "non-aromatic" when it is free of aromatic groups.

Specifically, more than 50 mole % of the recurring units of the semi-aromatic polyamide (PA1) (component A of the compositions in accordance with the instant invention) are obtainable by (and preferably, obtained by) the polycondensation reaction between at least one non-aromatic diacid (or derivatives thereof) and an aromatic diamine.

Preferably more than 75 mole % and more preferably more than 85 mole % of said recurring units can be obtained (and preferably, are obtained) by the polycondensation reaction between at least one aliphatic diacid or derivative thereof and at least one aromatic diamine. Still more preferably, essentially all or even all the recurring units of the semi-aromatic polyamide (PA1) can be obtained (and preferably, are obtained) by the polycondensation reaction between at least one aliphatic diacid or derivative thereof and at least one aromatic diamine.

The term diacid derivative is intended to encompass acid halogenides, especially chlorides, acid anhydrides, acid salts, acid amides and the like, which can be advantageously used in the polycondensation reaction.

The expression "at least one aliphatic diacid or derivative thereof" and "at least one aromatic diamine" are understood to mean that one or more than one aliphatic diacid or derivative thereof and one or more than one aromatic diamine can be made to react as above specified.

The aromatic diamine is preferably a $C_6$-$C_{24}$-aromatic diamine, more preferably a $C_6$-$C_{18}$-aromatic diamine, still more preferably a $C_6$-$C_{10}$-diamine such as m-xylylenediamine (MXDA). The aromaticity of the aromatic diamine results preferably from the presence therein of m-phenylene and/or o-phenylene groups, in a total amount ranging generally from 1 to 2.

Non limitative examples of aromatic diamines are m-phenylene diamine (MPD), p-phenylene diamine (PPD), 3,4'-diaminodiphenyl ether (3,4-ODA), 4,4'-diaminodiphenyl ether (4,4'-ODA) and m-xylylenediamine (MXDA), as shown below:

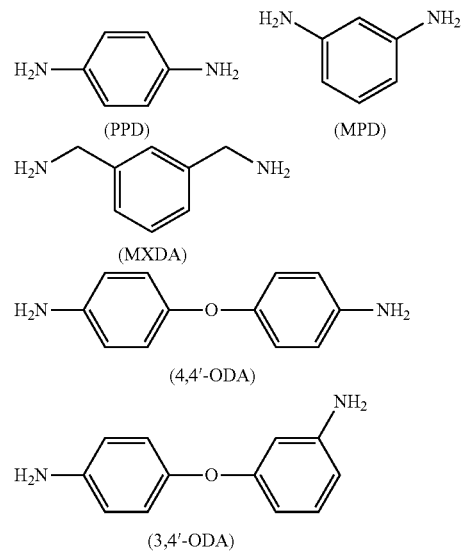

and p-xylylendiamine (PXDA, not represented).

The aliphatic diacid is preferably a $C_2$-$C_{16}$-aliphatic diacid, more preferably a $C_4$-$C_{12}$-aliphatic diacid, still more preferably a $C_6$-$C_{10}$-aliphatic diacid such as adipic acid. The aliphatic diacid is preferably linear.

As above mentioned, such aliphatic diacids can be used in the polycondensation reaction notably in the form of free acids and/or acid chlorides.

Non limitative examples of aliphatic diacids are notably oxalic acid (HOOC—COOH), malonic acid (HOOC—$CH_2$—COOH), succinic acid [HOOC—$(CH_2)_2$—COOH], glutaric acid [HOOC—$(CH_2)_3$—COOH], 2,2-dimethyl-glutaric acid [HOOC—$C(CH_3)_2$—$(CH_2)_2$—COOH], adipic acid [HOOC—$(CH_2)_4$—COOH], 2,4,4-trimethyl-adipic acid [HOOC—$CH(CH_3)$—$CH_2$—$C(CH_3)_2$—$CH_2$—COOH], pimelic acid [HOOC—$(CH_2)_5$—COOH], suberic acid [HOOC—$(CH_2)_6$—COOH], azelaic acid [HOOC—$(CH_2)_7$—COOH], sebacic acid [HOOC—$(CH_2)_8$—COOH], undecanedioic acid [HOOC—$(CH_2)_9$—COOH], dodecanedioic acid [HOOC—$(CH_2)_{10}$—COOH] and tetradecanedioic acid [HOOC—$(CH_2)_{12}$—COOH]. Cycloaliphatic diacids comprising at least one carbocyclic ring with of from 4 to 8 carbon atoms in the ring, like e.g. cyclohexane dicarboxylic acids may also be used.

According to a preferred embodiment PMXD6 polymers are used as polyamides (PA1).

For the purpose of the present invention, a PMXD6 polymer is intended to denote a semi-aromatic polyamide essentially all, if not all, the recurring units of which are obtainable by (and preferably, obtained by) the polycondensation reaction of adipic acid with meta-xylylene diamine.

PMXD6 polymers and other polymers suitable as the polyamide (PA1) are commercially available notably from Mitsubishi Gas Chemicals. Polymer materials comprising PMXD6 and a second polyamide (e.g. of the type as hereinafter referred to as polyamide (PA3) are notably commercially available as IXEF® polyamides from Solvay Advanced Polymers, L.L.C.

According to another embodiment PMXD10 polymers are used as polyamides (PA1).

For the purpose of the present invention, a PMXD10 polymer is intended to denote a semi-aromatic polyamide essentially all, if not all, the recurring units of which are obtainable by (and preferably, obtained by) the polycondensation reaction of sebacic acid with meta-xylylene diamine.

The molecular weight of the polyamide (PA1), preferably a PMXD6 polymer, is not particularly limited. The polyamide (PA1) has advantageously a number average molecular weight ($M_n$) of at least 2,500, more preferably of at least 5,000, more preferably of at least 10,000 and still more preferably of at least 13,000. In addition, the polyamide (PA1) has advantageously a number average molecular weight ($M_n$) of at most 60,000, more preferably of at most 50,000 and still more preferably of at most 30,000. All the preferred ranges given before apply also to the PMXD6 polymers which are preferably used in accordance with the present invention.

$M_n$ can be calculated according to the following formula:

$$M_n = 2 \times 10^6 / \Sigma(\text{—COOH end groups}) + (\text{—NH}_2 \text{ end groups})$$

(—COOH end groups)=number of acid end groups in uequivalents/gram of product resin (titrated with a base)

(—$NH_2$ end groups)=number of basic end groups in uequivalents/gram of product resin (titrated with an acid).

For the purpose of the present invention, it should be understood that the definition "semi-aromatic polyamide (PA1)" also encompasses polyamides further comprising less than 50 mole %, preferably less than 25 mole % and more preferably less than 15 mole % of recurring units obtainable by (and preferably, obtained by) the polycondensation reaction between at least one aliphatic diacid or derivative thereof, as above specified, and at least one aliphatic diamine. In this particular embodiment, said at least one aliphatic diamine may be a comonomer used in conjunction with one of the aromatic diamines as specified above. Said aliphatic diamine may be selected, for instance, among 1,2-diaminoethane, 1,2-diaminopropane, propylene-1,3-diamine, 1,3-diaminobutane, 1,4-diaminobutane, 1,5-diaminopentane, 1,6-hexanediamine or hexamethylenediamine (HMDA), 1,8-diaminooctane, 1,10-diaminodecane, 1,12-diaminododecane, and 1-amino-3-N-methyl-N-(3-aminopropyl)-aminopropane. A preferred aliphatic diamine is hexamethylenediamine (HMDA). Cycloaliphatic diamines comprising at least one carbocyclic ring having of from 4 to 8 carbon atoms in the ring, like e.g. 1,3-bis(aminomethyl)cyclohexane, bis-(4-aminocyclohexyl)methane or bis(3-methyl-4-aminocyclohexyl)methane are also suitable.

The content of the polyamide (PA1) (component A) in the polymer compositions of the present invention is preferably at least 10 wt. %, more preferably at least 20 wt. %, even more preferably at least 50 wt. %, still more preferably at least 75 wt. % and most preferably at least 85 wt. %, based on the combined weight of components A) and B).

The content of polyamide (PA1) (component A) can be up to 98 wt. %, preferably at most 95 wt. %, more preferably at most 92 wt. %, based on the combined weight of components A) and B).

The polymer compositions of the present invention comprise as component B at least one semi-aromatic polyamide (PA2) or at least one polyamide (PA3) or mixtures thereof.

More than 50 mole % of the recurring units of the semi-aromatic polyamide (PA2) are obtainable by (and preferably, obtained by) the polycondensation reaction between at least one aromatic diacid or derivative thereof and at least one aliphatic diamine The expression "at least one aromatic diacid or derivative thereof" and "at least one aliphatic diamine" are understood to mean that one or more than one aromatic diacid or derivative thereof and one or more than one aliphatic diamine can be made to react as above specified.

Non limitative examples of aliphatic diamines are notably 1,2-diaminoethane, 1,2-diaminopropane, propylene-1,3-diamine, 1,3-diaminobutane, 1,4-diaminobutane, 1,5-diaminopentane, 1,6-hexanediamine or hexamethylenediamine (HMDA), 1,8-diaminooctane, 1,10-diaminodecane, 1,12-diaminododecane, 1-amino-3-N-methyl-N-(3-aminopropyl)-aminopropane, 1,3-bis(aminomethyl)cyclohexane, bis-(4-aminocyclohexyl)methane or bis(3-methyl-4-aminocyclohexyl)methane.

A preferred aliphatic diamine is hexamethylenediamine (HMDA).

Aromatic diacids and derivatives thereof employed in the polycondensation reaction to yield the semi-aromatic polyamide (PA2) are not particularly restricted. Non limitative examples of aromatic diacids are notably phthalic acids, including isophthalic acid (IPA), terephthalic acid (TPA) and orthophthalic acid (OPA), naphthalenedicarboxylic acids, 2,5-pyridinedicarboxylic acid, 2,4-pyridinedicarboxylic acid, 3,5-pyridinedicarboxylic acid, 2,2-bis(4-carboxyphenyl)propane, bis(4-carboxyphenyl)methane, 2,2-bis(4-carboxyphenyl)hexafluoropropane, 2,2-bis(4-carboxyphenyl)ketone, 4,4'-bis(4-carboxyphenyl)sulfone, 2,2-bis(3-carboxyphenyl)propane, bis(3-carboxyphenyl)methane, 2,2-bis(3-carboxyphenyl)hexafluoropropane, 2,2-bis(3-carboxyphenyl)ketone and bis(3-carboxyphenoxy)benzene.

Preferably, the semi-aromatic polyamide (PA2) is a polyphthalamide, i.e. an aromatic polyamide of which more than 50 mole % of the recurring units are obtainable by (and preferably, obtained by) the polycondensation reaction between at least one phthalic acid, chosen among IPA, TPA and PA, or derivatives thereof, and at least one aliphatic diamine.

For the avoidance of doubt, the chemical structures of TPA, IPA, PA are depicted herein below:

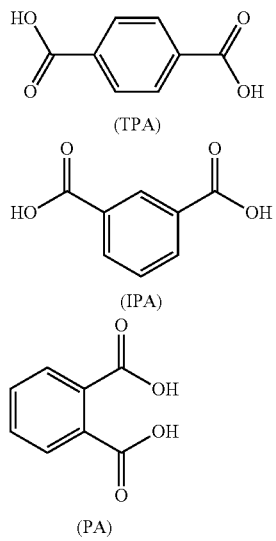

Suitable polyphthalamides in accordance with this preferred embodiment are notably available as AMODEL® polyphthalamides from Solvay Advanced Polymers L.L.C.

The semi-aromatic polyamides (PA2) may particularly preferably be chosen from poly(tere/iso)phthalamides.

For the purpose of the present invention, poly(tere/iso)phthalamides are defined as aromatic polyamides of which:
(i) more than 50 mole % of the recurring units are formed by the polycondensation reaction between terephthalic acid, isophthalic acid and at least one aliphatic diamine;
(ii) more than 25 and up to 50 mole % of the recurring units are formed by the polycondensation reaction between terephthalic acid and at least one aliphatic diamine; and
(iii) from 1 to 25 mole % of the recurring units are formed by the polycondensation reaction between isophthalic acid and at least one aliphatic diamine.

Poly(tere/iso)phthalamides may further comprise recurring units formed by the polycondensation reaction between at least one aliphatic diacid and at least one aliphatic diamine. In addition, poly(tere/iso)phthalamides are preferably free of recurring units formed by the polycondensation reaction between (ortho)phthalic acid (PA) and at least one diamine (aliphatic or aromatic).

The semi-aromatic polyamide (PA2) may also be chosen from polyterephthalamides or polyisophthalamides.

For the purpose of the present invention, polyterephthalamides respectively polyisophthalamides are defined as aromatic polyamides of which more than 50 mole % of the recurring units are formed by the polycondensation reaction between terephthalic respectively isophthalic acid and at least one aliphatic diamine.

A first class of polyterephthalamides respectively polyisophthalamides consists of respective polyamides essentially all, if not all, the recurring units of which are formed by the polycondensation reaction between terephthalic acid respectively isophthalic acid and at least one aliphatic diamine [class (I)].

A second class of polyterephthalamides respectively polyisophthalamides consists of respective polyamides essentially all, if not all, the recurring units of which are formed by the polycondensation reaction between mixtures of terephthalic acid and isophthalic acid and at least one aliphatic diamine [class (II)]. The molar ratio of terephthalic acid to isophthalic acid is not subject to particular restrictions and may be generally in the range of from 85:15 to 15:85, preferably in the range of from 70:30 to 30:70.

A third class of polyterephthalamides respectively polyisophthalamides consists of respective polyamides essentially all, if not all, the recurring units of which are formed by the polycondensation reaction between mixtures of terephthalic acid respectively isophthalic acid and at least one aliphatic diacid, and at least one aliphatic diamine [class (III)]. Such recurring units are respectively referred to as terephthalamide respectively isophthalamide and aliphatic acidamide recurring units.

Within class (III), a subclass consists of polyterephthalamides respectively polyisophthalamides in which the mole ratio of the terephthalamide respectively isophthalamide recurring units based on the total number of moles of the recurring units (i.e. the terephthalamide respectively isophthalamide plus the aliphatic acid-amide recurring units) is 60 mole % or more; in addition, it is advantageously 80 mole % or less, and preferably 70 mole % or less [subclass (III-1)].

Within class (III), a second subclass consists of polyterephthalamides respectively polyisophthalamides in which the mole ratio of the terephthalamide respectively isophthalamide recurring units based on the total number of moles of the recurring units (i.e. the terephthalamide respectively isophthalamide plus the aliphatic acid-amide recurring units) is less than 60 mole % [subclass (III-2)].

A fourth class of polyterephthalamides respectively polyisophthalamides consists of respective polyamides essentially all, if not all, the recurring units of which are formed by the polycondensation reaction between terephthalic acid, isophthalic acid, at least one aliphatic diacid and at least one aliphatic diamine [class (IV)].

Aliphatic acids and aliphatic amines useful for classes (I) to (IV) are those above described as suitable for polymers (PA1) and (PA2).

According to another embodiment, the polymer compositions in accordance with the instant invention may comprise at least one aliphatic polyamide (PA3) as component B.

More than 50 mole % of the recurring units of the aliphatic polyamide (PA3) are obtainable by (and preferably, obtained by) the polycondensation reaction between an aliphatic diacid (and/or a derivative thereof) and an aliphatic diamine, and/or by the auto-polycondensation reaction of at least one of an amino carboxylic acid or a lactam or mixtures thereof. Aliphatic diacids and aliphatic diamines are those above described as suitable for polymers (PA1) and (PA2).

Preferably more than 75 mole % and more preferably more than 85 mole % of the recurring units of the aliphatic polyamide (PA3) are obtainable by (and preferably, obtained by) the polycondensation reaction between an aliphatic diacid (and/or a derivative thereof) and an aliphatic diamine, and/or by the auto-polycondensation reaction of an amino carboxylic acid and/or a lactam. Still more preferably, essentially all or even all the recurring units of the aliphatic polyamide (PA3) are obtainable by (and preferably, obtained by) the polycondensation reaction between at least one aliphatic diacid or derivative thereof and at least one aliphatic diamine.

The aliphatic polyamide (PA3) is preferably selected from the group consisting of polytetramethylene adipamide (nylon 46), poly(hexamethylene adipamide) (nylon 66), poly(hexamethylene azelamide) (nylon 69), poly(hexamethylene sebacamide) (nylon 610), poly(hexamethylene dodecanoamide) (nylon 612), poly(dodecamethylene dodecanoamide) (nylon 1212), poly(11-amino-undecano-amide) (nylon 11), and copolymers and mixtures thereof.

Examples of polyamides obtainable by (and preferably, obtained by) the auto-polycondensation reaction of an amino carboxylic acid and/or a lactam are polycaprolactam (nylon 6), and poly(11-amino-undecano-amide) (nylon 11).

More preferably, the aliphatic polyamide (PA3) is chosen from nylon 6 and nylon 66.

Still more preferably, the aliphatic polyamide (PA3) is nylon 66, i.e. the polyamide obtainable by (and preferably, obtained by) the polycondensation reaction between 1,6-hexamethylenediamine and adipic acid.

As mentioned above, the polymer compositions can also comprise more than one polyamide (PA2) or (PA3) or mixtures of one or more than one polyamide (PA2) and one or more than one polyamide (PA3) as component B. In case of mixtures, the weight ratio of the polymers (PA2) and (PA3) is not subject to a restriction and can be freely chosen by the skilled man in accordance with the desired properties of the polymer compositions.

The content of the polyamide (PA2) and/or (PA3) (component B) in the polymer compositions of the present invention is preferably at least 2 wt. %, more preferably at least 5 wt. % and even more preferably at least 8 wt. %, based on the combined weight of components A) and B).

The content of polyamide component B can be up to 90 wt. %, preferably at most 80 wt. %, more preferably at most 50 wt. %, still more preferably at most 25 wt. %, and most preferably at most 15 wt. %, based on the combined weight of components A) and B).

The polymer compositions in accordance with the instant invention in accordance with a first embodiment comprise as component C) an organic substance (S) other than a poly (alkylene oxide)-polyamide block copolymer containing at least two alkylene oxide moieties of general formula

-A-O— wherein A denotes a $C_2$-$C_{10}$-alkylene group.

According to a first preferred embodiment substance (S) differs from polymers (in particular from random or block copolymers) comprising repeating units obtainable by the polycondensation reaction of a diamine and a diacid and/or by the auto-polycondensation reaction of an amino-acid. Such repeating units usually contain a —CO—NH— (secondary) amide functional group, commonly referred to as a peptidic linkage. Such secondary amide functional groups are also generally present in polyamide repeating units.

Polymeric substances (S), in accordance with a second preferred embodiment, may also be free of primary amide functional groups —CO—$NH_2$ and/or free of tertiary amide functional groups —CO—NR— or even free of any of the aforementioned functional amide groups.

Polymeric substances (S) may also be free of secondary urethane functional groups —O—CO—NH— and/or free of primary urethane functional groups —O—CO—$NH_2$ or tertiary urethane functional groups —O—CO—NR— or even free of any of the aforementioned urethane functional groups.

Furthermore, polymeric substances (S) may be free of secondary amidine functional groups —C(=NH)— and/or free of primary amidine functional groups —C(=NH)—$NH_2$ or tertiary amidine functional groups —C(=NH)—NR— or even free of any of the aforementioned amidine functional groups.

Polymeric substances (S) free of ester functional groups (—CO—O—) as generally present in repeating units of polyesters and/or free of carboxylic acid functional groups (—COOH) are also suitable.

Polymeric substances (S) in accordance with the instant invention, when taking into account the foregoing embodiments may be free of functional groups corresponding to the general formula —$(X^1)_xC(=Y)$—$X^2$ where $X^1$ and $X^2$ independently from each other may be chosen from NH—, $NH_2$, NR—, O— and OH, in particular $X^2$ independently from $X^1$ can be chosen from NH—, $NH_2$ and NR—, Y, independently from $X^1$ and $X^2$ may be chosen from O, NH, NR and in particular may be O and x, independently from $X^1$, $X^2$ or Y may be 0 or 1 and in particular may be 0.

The foregoing reference to functional groups relate to the presence of the said groups in the polymer chain or as a substituent to the polymer chain but is not intended to exclude products having the said functional groups, in particular the mentioned primary functional groups as end groups in the polymer chain. Thus, e.g. poly(alkylene oxides) having primary amino end groups and/or other primary end groups are not intended to be excluded.

Preferred are divalent groups A where the carbon atoms in the chain do not carry substituents which themselves comprise carbon atoms. Divalent group A is preferably a $C_2$-$C_6$ group such as n-hexylene, n-pentylene, n-butylene, propylene or ethylene. It is more preferably selected from the group consisting of n-propylene (—$CH_2$—$CH_2$—$CH_2$—), ethylene (—$CH_2$—$CH_2$—) and mixtures thereof. Still more preferably, it is ethylene, and the corresponding alkylene oxide moiety is ethylene oxide (—$CH_2$—$CH_2$—O—).

Polymers, including oligomers, represent a first possible choice for the substance (S). They are typically available in the form of a polymeric material having a certain degree of polydispersity (the polydispersity index is generally defined as the ratio of the weight average molecular weight to the number average molecular weight of a polymer), composed of a plurality of substances (S) differing from each other by their unique, single number of recurring units —O-A-. When S' denotes a preferred substance (S) having a molecular weight of e.g. at most 1,500, it will be understood that a poly(ethylene oxide) material having a number average molecular weight of e.g. 1,750, because of its polydispersity, might, for example, contain a certain amount of poly(ethylene oxide) substances (S') having individually a molecular weight of at most 1,500.

The molecular weight distribution of a material exhibiting a certain degree of polydispersity, in particular of a polymeric material such as a poly(alkylene oxide) material, can be easily determined by Gel Permeation Chromatography using a Jordi DVB Glucose BR Mixed Bed Linear packing column with a length (L) of 50 cm and an inner diameter (I.D.) of 10 mm, a refractive index detector, DMSO as the solvent, a flow rate of 1.0 mL/min, a temperature of 80° C. and polystyrene or poly(ethylene oxide) calibration standards. When the substance (S) is a plurality of substances composing a material exhibiting a certain degree of polydispersity, in particular of a polymeric material such as a poly(alkylene oxide) material, it is advantageously characterized by its number and/or its weight average molecular weight (methods for the determination of weight and number average molecular weights are known to the skilled man).

The number average or the weight average molecular weight of a substance (S) suitable for use in the polymer compositions in accordance with the instant invention is advantageously at least 100; it is preferably of at least 200, more preferably of at least 300, still more preferably of at least 400. Besides, the number average or the weight average molecular weight of such a substance (S) may be generally of at most 20,000,000, at most 10,000,000, at most 8,000,000, at most 5,000,000, at most 500,000, at most 200,000, at most 100,000, at most 50,000, at most 20,000, at most 10,000, at most 5,000 or at most 2,000. The preferred molecular weight depends to a certain degree on the nature of substance (S). In some cases, notably when the substance (S) was a cationic, anionic or non ionic emulsifier, good results were obtained with substances S the number average or the weight average molecular weight of which was of at most 1,500, at most 1,000 or at most 750. In other cases, notably when the substance (S) was a poly(alkylene oxide), good results were obtained with substances S the number average or the weight average molecular weight of which was of at least 2,000, at least 10,000 or at least 100,000.

The substance (S) may be free of carbon atoms other than the carbon atoms contained in divalent group A. Alternatively, the substance (S) may further contain at least 4, at least 8, at least 10, at least 12, at least 14, at least 16, at least 18 or at least 20 carbon atoms other than the carbon atoms contained in divalent group A; besides, the substance (S) in case of low molecular weight compounds S may contain carbon atoms other than the carbon atoms contained in divalent group A in an amount of not exceeding 40, 30, 25, 20, 18 or 16 carbon atoms.

According to a second embodiment of the instant invention, the substance (S) is selected from the group consisting of poly(alkylene oxide)s, alkoxylated acyclic carboxylic acids, alkoxylated acyclic carboxylic acid esters, alkoxylated acyclic carboxylic acid metal salts, alkoxylated acyclic partially fluorinated carboxylic acids, alkoxylated perfluorinated carboxylic acids, alkoxylated acyclic alcohols, alkoxylated partially fluorinated acyclic alcohols, alkoxylated acyclic perfluoroalcohols, alkoxylated alkyl phenols, alkoxylated acyclic amines, alkoxylated partially fluorinated acyclic amines, alkoxylated acyclic perfluoroamines, alkoxylated acyclic amides, alkoxylated alkyl sulfates, alkoxylated partially fluorinated alkyl sulfates, alkoxylated perfluorinated alkyl sulfates, alkoxylated alkyl sulfonates, alkoxylated partially fluorinated alkyl sulfonates, alkoxylated perfluorinated alkyl sulfonates, alkoxylated alkylaryl sulfonates, alkoxylated mono- or dialkyl sulfosuccinates and sulfosuccinamates, alkoxylated alkyl or alkylaryl phosphates or from substances consisting essentially of at least one hydrophilic first block and at least one lipophilic second block, known to the skilled person as non-ionic, anionic or cationic emulsifiers.

Emulsifiers are a group of surfactants, which latter compounds are generally considered to embrace compounds that lower the surface tension of a liquid, the interfacial tension between two liquids, or that between a liquid and a solid. Surfactants may act as detergents, wetting agents, emulsifiers, foaming agents, and dispersants.

An emulsifier is generally a compound used to keep mixtures of immiscible fluids well dispersed. An emulsifier positions itself with its two different parts of the molecule at the interface of the immiscible fluids thus preventing clumping of the molecules of the fluids.

The substance (S) is preferably free of ethylenic unsaturation, preferably the organic substance (S) contains only fully saturated C—C bonds and no C—C double or triple bonds.

The substance (S) may in general be non ionic, anionic or cationic.

The substance (S) may consist essentially of hydrophilic -A-O— moieties.

A number of suitable substances S is described below with reference to a number of different embodiments of the present invention. It is apparent however, that modifications of these substances described hereinafter are possible and the skilled man can choose from a broad variety of alternatives.

A first preferred group of substances S are the so called poly(alkylene oxides), sometimes also referred to as polyalkylene glycols.

Polyalkylene oxides suitable for use in the present invention are a polymer essentially consisting of a repeating unit represented by formula —$R^1$—O— (wherein $R^1$ represents a divalent alkylene group having from 2 to 8 carbon atoms) and having a hydroxyl group at the terminals thereof. Particularly suitable polyalkylene oxides are those wherein $R^1$ has from 2 to 4 carbon atoms.

A part of the hydrogen atoms of the alkylene group $R^1$ may be substituted with other atoms or atomic groups. The poly (alkylene oxide) may be comprised of only the above-described repeating unit (—$R^1$—O—) or may further contain other repeating units. In the latter case, the proportion of the repeating unit of formula —$R^1$—O— is at least 50% by weight, and preferably at least 80% by weight. The poly (alkylene oxide) may be either linear or branched. Linear poly(alkylene oxides) are generally preferred.

Specific examples of suitable poly(alkylene oxides) include polyoxyalkylene polyols, e.g., polyoxyethylene glycol (also known as poly(ethylene glycol) or poly(ethylene oxide), polyoxyethylene triol, polyoxyethylene tetraol, polyoxypropylene glycol (also commonly referred to as poly(propylene glycol) or poly(propylene oxide), polyoxypropylene triol, polyoxypropylene tetraol, polyoxybutylene glycol, polyoxypentane glycol, polyoxyhexane glycol, polyoxyheptane glycol, and polyoxyoctane glycol. These polymers may be used either individually or in combinations of two or more.

The hydroxyl end groups of the poly(alkylene oxides) may according to a preferred embodiment be partly or fully substituted by alkoxide groups, preferably methoxy or alkoxy. Methods for converting hydroxyl groups of poly(alkylene oxides) into alkoxy groups are known to the skilled man and described in the literature.

The molecular weight of the poly(alkylene oxides) in accordance with this embodiment may cover a wide range as discussed above generally for the substances S. In certain cases poly(alkylene oxides) having a number average or weight average molecular weight of at least 20,000, preferably at least 200,000 and even more preferably at least 1,000,000 have proven to be advantageous. In particular an increase in strain at break with increasing molecular weight of the poly(alkylene)oxide could be observed in certain cases without a detrimental effect on Young's modulus or stress at break. In other cases average molecular weights of at most 20,000, preferably at most 10,000 and even more preferably at most 1000 have been found useful. The molecular weight of the poly(alkylene oxides) suitable may also be optimized in view of the processing parameters or conditions. Thus, e.g. lower molecular weight poly(alkylene oxides) are often liquid and may thus be more difficult to feed to an extruder and may be partly removed during degassing steps. For those applications, higher molecular weight products would be preferable. The skilled person is aware of the physical properties as a function of molecular weight and will chose the best product accordingly.

According to a preferred embodiment a methoxy-terminated poly(ethylene oxide) having a number average or a weight average molecular weight of at most 2,000, more preferably at most 1,000 and most preferably having a number or weight average molecular weight of approximately 500 may be used.

Copolymers comprising ethylene oxide and e.g. propylene oxide units in random or block distribution are also suitable and respective products are commercially available under the tradename Pluronics® from BASF.

Examples of substances S with lipophilic and hydrophilic blocks include those substances well known to the skilled person as "non ionic emulsifiers", "anionic emulsifiers" and "cationic emulsifiers".

These emulsifiers may be alkoxylated acids, alcohols, amines and amides and preferably alkoxylated fatty carboxylic acids, alcohols, amines and amides having seven or more carbon atoms, which all belong to the family of non ionic emulsifiers.

Examples of alkoxylated fatty carboxylic acids having seven or more carbon atoms are the condensation products of from 2 to 50 moles (in particular, from 4 to 16 moles) of an alkylene oxide (such as ethylene oxide) with one mole of a saturated fatty acid chosen from stearic acid, palmitic acid, lauric acid, capric acid, pelargonic acid, caprylic acid, enanthic acid, myristic acid, pentadecanoic acid, arachidic acid, behenic acid, lignoceric acid. Other examples of alkoxylated carboxylic acids are the condensation product of from 2 to 50 moles of an alkylene oxide such as ethylene oxide with one mole of an unsaturated fatty acid chosen from oleic acid, linoleic acid, and linolenic acid.

In another preferred embodiment the substance (S) contains one or more ethoxylated fatty acids of general formula $R-C(=O)-(OCH_2CH_2)_n-OH$ where R is an aliphatic alkyl group having from 7 to 24, preferably from 10 to 24 carbon atoms and n is an integer between 1 and 20. Especially preferred examples thereof are Deplastol® commercial products which are condensates of about 4-5 mol ethylene oxide units with lauric acid and/or myristic acid. Deplastol® materials are available from Cognis. Corresponding propoxylated and/or butylated fatty acids may also be included in the organic substance (S).

Examples of alkoxylated alcohols are the condensation product of from 2 to 50 moles of an alkylene oxide such as ethylene oxide with a mole of a saturated or unsaturated fatty alcohol chosen from stearyl alcohol (1-octadecanol), isostearyl alcohol (16-methylheptadecan-1-ol), elaidyl alcohol (9E-octadecen-1-ol), oleyl alcohol (cis-9-octadecen-1-ol), linoleyl alcohol (9Z,12Z-octadecadien-1-ol), elaidolinoleyl alcohol (9E,12E-octadecadien-1-ol), linolenyl alcohol (9Z, 12Z,15Z-octadecatrien-1-ol), elaidolinolenyl alcohol (9E, 12E,15-E-octadecatrien-1-ol), ricinoleyl alcohol (12-hydroxy-9-octadecen-1-ol), arachidyl alcohol (1-eicosanol), behenyl alcohol (1-docosanol), erucyl alcohol (cis-13-docosen-1-ol), lignoceryl alcohol (1-tetracosanol), ceryl alcohol (1-hexacosanol), montanyl alcohol, cluytyl alcohol (1-octacosanol), myricyl alcohol, melissyl alcohol (1-triacontanol), geddyl alcohol (1-tetratriacontanol) and cetearyl alcohol.

Respective products with a lipophilic part based on fatty acid alcohols and a hydrophilic part based on poly(alkylene oxide) groups are commercially available under the tradenames Brij®, Genapol® and Lutensol® from Atlas Chemical Co., Clariant and BASF, respectively.

Alkoxylated organic substances S suitable for use in the composition of the invention include Disponil® materials that are also commercially available from Cognis (now BASF). Preferred are Disponil® products LS 2, 4 and/or 10, which are condensates of ethylene oxide units with lauric acid and/or myristic acid comprising, respectively, 2, 4 or 10 moles of ethylene oxide. Disponil® TA products which are $C_{16}/C_{18}$ ethoxylated alcohols having polyoxyethylene substituents of different length are also preferred. Disponil® OP and Disponil® NP products which are ethoxylated octylphenols and nonylphenols may also be included in the compositions as component C) in accordance with the instant invention.

The substance (S) may be an anionic emulsifier such as the condensation product of from 2 to 50 moles (in particular, from 4 to 16 moles) of an alkylene oxide (such as ethylene oxide) with a mole of an alkali metal (e.g. Na) or a pseudo alkaline metal like e.g. $NH_4$, alkyl sulfate, alkyl sulfonate, alkylaryl sulfonate, sulfosuccinate or phosphate.

Mention may be made, as examples of anionic emulsifiers, of ethoxylated sodium monoalkyl sulphosuccinates, or ethoxylated sodium or ammonium nonylphenyl phosphates.

Mention may be also be made, as examples of anionic emulsifiers, of ethoxylated, ammonium or sodium, linear or branched $C_6$, $C_8$, $C_{10}$, $C_{12}$, $C_{14}$, $C_{16}$ and $C_{18}$ alkyl sulfates. The ethoxylated anionic emulsifier may e.g. contain 2, 4, 8, 12 or 24 moles of ethylene oxide/mole of alkyl sulfate.

Mention may be also be made of Hostapal® BV, an ethoxylated sodium alkoxylated tri(t-butyl)phenyl sulfonate commercially available from Clariant, and ethoxylated nonylphenyl sulfonates containing 2, 4, 8, 12 or 24 moles of ethylene oxide/mole of nonylphenyl sulfonate.

A further group of suitable alkylene oxide groups containing compounds suitable as component C) in the compositions in accordance with the instant invention are amine-terminated poly(alkylene oxides), in particular amine-terminated poly (ethylene oxides) or amine-terminated poly(propylene oxides), including copolymers comprising both mentioned types of alkylene oxide units which are commercially available under the tradename Jeffamine® from Huntsman Chemical Corporation.

In a number of cases compounds S selected from the group of the so-called fluorosurfactants have proven advantageous.

In general such fluorosurfactants may be characterized by a content of fluorine in the molecule which might either arise from the copolymerization of a partially or fully fluorinated alkylene oxide with a non-fluorinated alkylene oxide or by reaction of fluorine containing reactants with poly(alkylene oxides) thus providing endgroups with a fluorine content.

In the first case the oligomer or polymer comprises, in addition to the alkylene oxide groups, a certain amount of respective groups having one or more fluorine atom, i.e. in the case of ethylene oxide as the alkylene oxide these compounds comprise units $-(CH_2-CH_2-O)-$ and units $-(CH_{2-a}X_a-CH_{2-b}X_b-O)-$ where X represents fluorine and at least one of a or b is at least one.

In certain cases fluorosurfactants of the general structure

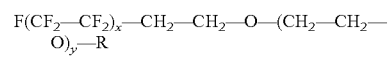

wherein R is H or an alkoxy group and x and y have a value in the range of from 1 to 50, preferably in the range of from 1 to 30 and particularly preferred x and y are at most 20, have proven advantageous. Products of this type having a number or weight average molecular weight of at most 2000, preferably at most 1500 and even more preferably at most 1000 have shown especially good results.

The ratio of x vs. y is not subject to specific restrictions and may be selected within a wide range.

A number of fluorosurfactants of this type is available from DuPont under the tradename Zonyl®.

Another group of compounds suitable as component C) [substance (S)] include fluorosurfactants based on short chain molecules having six or less groups $CF_2$ and terminated at one end with fluorine and bound to a delivery system such as a polymer or surfactant as commercially available from Du Pont under the tradename name Capstone®.

A number of particularly preferred components C) are given in the working examples hereinafter.

The content of component C) in the polymer compositions in accordance with the instant invention is at least 0.01 wt. %, preferably at least 0.05 wt. %, more preferably at least 0.1 wt. % and most preferably at least 0.3 wt. %, based on the combined weight of components A), B) and C).

The content of compound C) is at most 15, preferably at most 10, more preferably at most 8 and most preferably at most 5 wt. %, based on the combined weights of components A) to C).

Good results have been achieved with amounts of component C) of even less than 1 wt. %, based on the combined weight of components A) to C).

In case of filler containing polymer compositions as described in more detail hereinafter the optimum amount of component C) is generally somewhat higher than in unfilled compositions.

The polymer compositions in accordance with the instant invention can essentially or entirely consist of components A) to C) or they can contain additional components in substantial percentages, in particular fillers.

In compositions without fillers, components A) to C) generally constitute at least 80 wt. %, in most cases at least 90 wt. % and preferably at least 95 wt. %, based on the weight of the entire composition. As mentioned the polymer compositions in accordance with the instant invention may consist exclusively of components A) to C) or, in the alternative, can contain certain further additives known to the skilled man in compositions of this type.

In certain cases, it has proven advantageous to include fillers in the compositions in accordance with the instant invention.

Any filler is in principle suitable for use in the present invention; fillers known for being profitably incorporated into a polyamide matrix may be advantageously used. The skilled person will easily recognize the filler which fits best for the polymer composition in accordance with the instant invention. Generally, the filler is chosen depending on its chemical nature, its number average length, its number average diameter, its number average aspect ratio, its ability to feed nicely in compounding equipment without bridging and surface treatment (notably because good interfacial adhesion between the filler and the polyamide improves the stiffness and the toughness of the blend).

According to certain embodiments the filler is a reinforcing filler. Reinforcing fillers are well known to the skilled man in the art. Reinforcing fillers, when used, generally form a blend having a tensile strength which is higher than that of the polymer composition without filler. The tensile strength can be measured on 3.2 mm (0.125 in) thick ASTM test specimens in accordance with ASTM D-638. Platy fillers, acicular fillers and fibrous fillers are generally reinforcing fillers, and can often provide a high increase in the tensile strength of the polymer compositions.

Platy fillers are well known by the persons skilled in the art. Typically, platy fillers consist essentially of, or even consist of, particles having the shape of, or resembling to a plate, i.e. the particles are flat or nearly flat and their thickness is small in comparison with the other two dimensions. Certain platy fillers are notably described in chapter 17.4.2, p. 926 to 930 of Plastics Additives Handbook, $5^{th}$ edition, Hanser, the whole content of which is herein incorporated by reference. As referred to hereinafter, the parameter n denotes the refractive index under standard conditions and H denotes the Mohs hardness. The Mohs hardness scale consists of 10 standard minerals starting with talc (Mohs hardness 1) and ending with diamond (Mohs hardness 10). The hardness is determined by finding which of the standard minerals the test material will scratch or not scratch; the hardness will lie between two points on the scale—the first point being the mineral which is scratched and the next point being the mineral which is not scratched. The steps are not of equal value; e.g. the difference in hardness between 9 and 10 is much bigger than between 1 and 2. Non limitative examples of platy fillers include talc (n=1.57-1.69, H=1), micas such as muscovite mica (n=1.55-1.61; H ranges from 2.5 to 4) and phlogopite mica (n=1.54-1.69, H=2.5-3), kaolins such as kaolinite (n=1.56-1.61, H=2), calcinated kaolin or mullite (n=1.62, H ranges from 6 to 8, depending on the calcination temperature), and clay such as Bali clay (n=1.6, H=2-2.5).

Acicular fillers are also well known by the skilled in the art. Typically, acicular fillers consist essentially of, or even consist of, particles having the shape of, or resembling a needle. The particles of acicular fillers, as contained in the polymer composition in accordance with the instant invention, have typically a number average aspect ratio of between 2 and 20. Notably to the purpose of achieving an increased reinforcing effect, the number average aspect ratio of the particles as contained in the polymer composition in accordance with the instant invention, is preferably at least 3.0, more preferably at least 4.5, still more preferably at least 6.0; when high dimensional stability and low warpage are needed, the number average aspect ratio is preferably at most 15. The number average aspect ratio of the particles of a filler can be determined by optical microscopy coupled with an image analysis software. To this purpose, the particles are advantageously finely dispersed in a solvent such as ethanol. The magnification ranges generally from about 200 to about 400. The image analysis software can be based on Otsu's method as described in "A Threshold Selection Method from Gray-Level Histograms", IEEE Trans. Syst. Ma, Cybern., 9, 62-66 (1979), the whole content of which is herein incorporated by reference. The number average aspect ratio can be defined as the number average of the aspect ratios of each particle taken individually, and the aspect ratio of a particle can be defined as its length over diameter ratio. The length of a particle can be defined as the length of the major axis of the ellipse having the same normalized second order moment as the particle, while the diameter of the particle can be defined as the length of the minor axis of the ellipse having the same normalized second order moment as the particle.

Among acicular fillers, wollastonite (n=1.65, H=4.5-5) and xonotlite (n=1.59, H=6.5) are preferred. Wollastonite is a white calcium metasilicate with good resistance to alkalis; wollastonite is notably described in chapter 17.4.3.1, p. 930 to 931 of Plastics Additives Handbook, $5^{th}$ edition, Hanser, the whole content of which is herein incorporated by reference. Xonotlite is an inosilicate; typically, its formula is $Ca_6Si_6O_{17}(OH)_2$. Other acicular fillers suitable for the purpose of the present invention include sepiolite, attapulgite and palygorskite.

Finally, fibrous fillers are also well known by the skilled in the art. Typically, fibrous fillers consist essentially of, or even consist of, particles having the shape of, or resembling a fibre, i.e. the particles are slender and greatly elongated, and their length is very high in comparison with the other two dimensions. Notably to the purpose of increased reinforcement, the particles of fibrous fillers, as contained in the polymer composition in accordance with the instant invention, have:

a number average aspect ratio of typically above 5, preferably above 10 and more preferably above 15;

a number average length of typically at least 50 μm, preferably at least 100 μm and more preferably at least 150 μm; and a number average diameter of typically below 25 μm, preferably below 20 μm, and more preferably below 15 μm.

When contained in the composition in accordance with the instant invention, the particles of fibrous fillers have a number average length generally below 30 mm, and a number average diameter generally above 3 μm. Certain fibrous fillers are notably described in chapters 17.4.3.2 and 17.4.3.3, p. 930 to 931 of Plastics Additives Handbook, 5$^{th}$ edition, Hanser, the whole content of which is herein incorporated by reference. Among fibrous fillers usable in accordance with the present invention, glass fibre, asbestos, synthetic polymeric fibre, aramid fibre, aluminum fibre, titanium fibre, magnesium fibre, aluminum silicate fibre, silicium carbide fibres, boron carbide fibres, rock wool fibre, steel fibre, carbon fibre etc. can be cited. As can be seen, a particular class of fibrous fillers consists of whiskers, i.e. single crystal fibres made from various raw materials, such as $Al_2O_3$, SiC, BC, Fe and Ni. Among fibrous fillers, glass fibres are preferred; they include chopped strand A-, E-, C-, D-, S- and R-glass fibres, as described in chapter 5.2.3, p. 43-48 of Additives for Plastics Handbook, 2$^{nd}$ edition, John Murphy, the whole content of which is herein incorporated by reference. Depending on their type, glass fibres have a refractive index n of from about 1.51 to about 1.58, and a Mohs hardness H of on average about 6.5.

Preferably, the filler is chosen from acicular fillers and fibrous fillers in case a composition with increased tensile properties is aimed for.

Very preferably, the filler is chosen from fibrous fillers. Excellent results have been obtained with glass fibres.

Poly(alkylene oxides), preferably poly(ethylene oxide) as compound C) in combination with glass fibres as fillers yields compositions showing surprisingly good modulus and stress behaviour.

The skilled man will decide on the type of filler in accordance with the desired properties of the polymer compositions.

In case where fillers are not primarily used for increasing tensile strength, spherical fillers or fillers with a shape coming close to a spherical particle may be advantageously used.

In certain embodiments, the filler is chosen from nanoparticulate fillers, such as carbon nanotubes. Nanoparticulate fillers may have a particle size below 300 nm, or even below 100 nm.

Amongst all the fillers, it is worth noting that so called graphene materials showed some advantageous particular results. Thus, while the invented polymer compositions are generally free of any graphene material, certain polymer compositions in accordance with a particular embodiment of the present invention do comprise a graphene material.

Graphene itself is usually considered as a one-atom thick planar sheet of sp2-bonded carbon atoms that are densely packed in a honeycomb structure. The name graphene is derived from graphite and the suffix -ene. Graphite itself consists of a high number of graphene sheets stacked together.

Graphite, carbon nanotubes, fullerenes and graphene in the sense referred to above share the same basic structural arrangement of their constituent atoms. Each structure begins with six carbon atoms, tightly bound together chemically in the shape of a regular hexagon—an aromatic structure similar to what is generally referred to as benzene.

Perfect graphenes consist exclusively of hexagonal cells; pentagonal and heptagonal cells constitute defects in the structure. If an isolated pentagonal cell is present, the plane warps into a cone shape and the insertion of 12 pentagons would create a fullerene.

At the next level of organization is graphene itself, a large assembly of benzene rings in a basically planar sheet of hexagons that resembles chicken wire. The other graphitic forms are built up out of graphene. Buckyballs and the many other nontubular fullerenes can be thought of as graphene sheets wrapped up into atomic-scale spheres, elongated spheroids and the like. Carbon nanotubes are essentially graphene sheets rolled into minute cylinders. And finally, graphite is a thick, three-dimensional stack of graphene sheets; the sheets are held together by weak, attractive intermolecular forces (Van der Waals forces). The feeble coupling between graphite sheets enables graphite to be broken up into miniscule wafers.

In the chemical literature graphene was defined officially in 1994 by the IUPAC (Boehm et al., Pure an Appl. Chemistry 66, 1893-1901 (1994)) as follows:

A single carbon layer of the graphitic structure can be considered as the final member of the series naphthalene, anthracene, coronene, etc. and the term graphene should therefore be used to designate the individual carbon layers in graphite intercalation compounds.

According to the IUPAC compendium on technology, the term graphene should only be used when the reactions, structural relations or other properties of individual layers are discussed, but not for three-dimensional structures.

In the literature graphene has also been commonly referred to as monolayer graphite.

One way to obtain graphene is to exfoliate it, i.e. to peel it off from graphite with an adhesive tape repeatedly. Graphene produced this way is, however, extremely expensive.

Another method is to heat silicon carbide to temperatures above 1100° C. to reduce it to graphene. This process produces a sample size that is dependent upon the size of the SiC substrate used. However, again, products obtained by this process are still very expensive.

Experimental methods have been reported for the production of graphene ribbons consisting of cutting open carbon nanotubes (Nature 2009, 367). Depending on the substrate used (single- or multi-walled nanotubes) single graphene sheets or layers of graphene sheets can be obtained. However, due to the fact that carbon nanotubes are very expensive materials, graphene products obtained this way are not commercially feasible as components of polymer compositions.

M. Choucair et al., Nature Nanotechnology 4, 30-33 (2009) disclose a process for producing gram quantities of graphene by the reduction of ethanol by sodium metal, followed by pyrolysis of the ethoxide product and washing with water to remove sodium salts.

Recently, a new type of graphene materials, so called nanographene platelets or NGP, has been developed and respective products are commercially available, for example from Angstron Materials LLC. NGP refers to an isolated single layer graphene sheet (single layer NGP) or to a stack of graphene sheets (multi-layer NGP). NGPs can be readily mass produced and are available at much lower costs and in larger quantities compared to carbon nanotubes. A broad array of NGPs with tailored sizes and properties can be produced by a combination of thermal, chemical and mechanical treatments.

Typically, without being limited thereto, the stack thickness of NGPs can be as low as 0.34 nm (single-layer NGP) and up to 100 nm or even more (multi-layered NGP). The number of single layers in a NGP can be easily derived from the stack thickness by dividing same by the thickness of a single graphene layer (which is 0.34 nm). Thus, e.g. a NGP with a stack thickness of 2 nm comprises 6 single graphene layers.

The aspect ratio of NGPs can generally cover a very broad range of from 1 to 60,000, preferably of from 1 to 25,000 and most preferably of from 1.5 to 5000. Particularly preferred platelets have an aspect ratio in two directions or dimensions of at least 2, in particular of at least 3 or more. This aspect ratio applies for nanographene platelets in two dimensions and in this respect nanographene platelets differ from carbon black or carbon-nanotubes. Carbon black particles are spheroidal and lack any significant aspect ratio relating to their dimensions. Carbon-nanotubes have a high aspect ratio in one direction, along the length or main axis of the carbon tube. This is a characteristic feature of an elongated structure like a fibrous or needle like particle. Compared to this platelets have a high aspect ratio for two of the three directions or dimensions relative to the third direction or dimension. This difference has a significant influence on the properties of the products in accordance with the instant invention as is apparent from the examples. Typically, the length and width of NGPs parallel to the graphene plane is in the range of from 0.5 to 20 micrometers.

The specific surface area of NGP can vary over a wide range, but is generally higher than the specific surface area of standard graphite when measured under identical conditions. This is an indication of the inherently much finer scale and exfoliation of NGPs. The specific surface area, as measured by the BET method (as described below) preferably exceeds 6 m$^2$/g, more preferably 9 m$^2$/g and even more preferably 12 m$^2$/g and may be as high as exceeding 30 m$^2$/g, preferably exceeding 60 m$^2$/g and even exceeding 90 m$^2$/g. Good results have also been obtained with specific surface areas of less than 40 m$^2$/g, in certain cases as low as below 30 m$^2$/g and in particular with surface areas of up to 20 m$^2$/g. Measured specific surface areas for several of the nano-graphene platelets (NGP) described in the examples along with that of standard graphite are shown in Table A The BET measurement was carried out as follows:

Material Pre-Treatment

All samples were first treated in a non-ventilated oven at 330° C. for 6 hours prior to any further analysis. Following this pretreatment step, essentially aimed at eliminating residual traces of possible surfactants or other organic surface treatments, vacuum drying was conducted at 150° C. to ensure that all samples are thoroughly dry and surfactant-free, so as to allow proper specific surface area comparison between them.

Equipment Used

The BET equipment used was a GEMINI 2360 from MICROMETRICS. Auxiliary equipment (vacuum pump, FLOWPREP sample conditioner, helium and nitrogen compressed gas bottles, liquid nitrogen, samples holders, etc.) were used according to standard procedures.

Experimental Procedure

The empty tube was first purged by helium for about 15 minutes then sealed under helium atmosphere. The sealed tube was weighed (0.0001 g accurate; $P_1$=empty tube weight). About 200 mg of sample material was introduced into the tube using a funnel (in practice, sample weights in the range 30-170 mg have been used; weight determination 0.1 mg accurate). The tube was again put under helium atmosphere for about 15 minutes prior to being sealed. The filled tube was next weighed (0.0001 g accurate; $P_2$=empty tube weight plus sample weight). The tube was put into the FLOW-PREP oven at 275° C.; vacuum was progressively applied and held for about 2 hours, after which the tube was slowly cooled, filled with helium and sealed. The sealed tube was again weighed (0.0001 g accurate; $P_3$=empty tube weight plus sample weight). The effective sample weight was P (g)=P3–P1. At this point, the tube was unsealed and connected to the GEMINI 2360 apparatus. A dewar was filled with liquid nitrogen and the BET experimental specific surface (SSA) determination was started by following the instructions from the GEMINI software interface.

TABLE A

| grade | SSA (BET) |
|---|---|
| N-006-010-00 | 17 |
| N-002-001-05 | 37 |
| N002-001-00 | 23 |
| N002-PDR-05 | 502 |
| N002-PDR-02 | 431 |
| N-002-PD | 290 |
| N-002-PDEX | 415 |
| HC-Carbon | 5 |

Furthermore, NGPs are available in different degrees of polarity, generally characterized by the oxygen content of the graphene surface. NGPs having an oxygen content of 0.5% by weight or more are generally referred to as polar grades whereas NGPs having an oxygen content of less than 0.5% by weight, preferably 0.2% by weight or less are referred to as non-polar grades. The oxygen content of nanographene platelets can cover a broad range and may, depending on the process of manufacture or the treatment conditions, range from as low as less than 0.1 wt % to as high as 40 wt %. In some cases products with higher oxygen content in the range of from 2 to 40 wt % have shown good results whereas in other cases products with low oxygen content of below 1%, preferably below or equal to 0.5% have been advantageous. All these types of products are commercially available, for example from Angstron Materials LLC, other suppliers offering part of the range.

All structural parameters discussed hereinbefore and below refer to the graphene materials as such, i.e. these properties are determined prior to the incorporation of the graphene material into the polymer matrix. As is well known to the man skilled in the art, during compounding according to the usual methods, properties like aspect ratio or thickness may change so that the respective values of the aforementioned parameters in the molding composition or in the molded product might be different from what has been described above.

A series of nano graphene platelets having proved as advantageous in certain compositions in accordance with the instant invention are available from Angstron LLC under the designations N-008-100-P or -N or N-006-010-N or -P and N-002-001-N or -P.

The filler, when present, is generally contained in the polymer composition in an amount of from 0.1 to 60 wt. %, preferably of from 0.3 to 60 wt. %, more preferably of from 0.5 to 50 wt. %, still more preferably from 1 to 60 wt. % and even more preferably of from 2 to 30 wt. %, based on the weight of the composition.

The composition in accordance with the instant invention can further comprise other components and additives known to the skilled man and described in the literature. Thus, a detailed description of these additional components is not necessary here. The skilled man will select such additional components depending on the final use of the product.

The polymer compositions in accordance with the present invention showed an advantageous property profile. In most cases ductility, elongation at break and impact resistance were improved compared to respective compositions not containing component C) while a high strength and rigidity were maintained.

Without being bound by any theory, the benefitial property profile achieved through the incorporation of the substance (S) could result from the unexpected ability of said substance (S) to act as some kind of compatibilizer between polyamides of different types, in particular between the at least one semi-aromatic polyamide (PA1) on one hand, and the at least one other polyamide selected from the group consisting of (i) semi-aromatic polyamides (PA2) and (ii) aliphatic polyamides (PA3) on the other hand. Hence, another facet of the present invention is directed to the use of an efficient amount of at least one substance (S) as herein described, for increasing the compatibility between a first polyamide and a second polyamide, wherein at least part of the recurring units of the first polyamide and of the second polyamide differ from each other, and still another aspect of the present invention is directed to polymer compositions comprising:

A') at least 10 wt. %, based on the combined weight of A') and B'), of a first polyamide (PA1'), for example a semi-aromatic polyamide (PA1) as above described;
B') a second polyamide (PA2'), for example a semi-aromatic polyamide (PA2) or an aliphatic polyamide (PA3) as above described; and
C') at least 0.01 wt. %, based on the combined weight of A') to C') of at least one alkylene oxide-containing organic substance (S) other than a poly(alkylene oxide)-polyamide block copolymer, said substance (S) containing at least two alkylene oxides moieties of general formula

—O-A- wherein A denotes a $C_2$-$C_{10}$ alkylene group,
wherein at least part of the recurring units of the first polyamide (PA1') and of the second polyamide (PA2') differ from each other.

Quite unexpectedly, good results were achieved with these polymer compositions including when more than 10 mole %, when more than 30 mole %, when more than 50 mole %, when more than 70 mole %, when more than 90 mole %, when essentially all, and even when all the recurring units of the first polyamide (PA1') and of the second polyamide (PA2') differed from each other.

The content of the first polyamide (PA1') (component A') in these polymer compositions can comply with any above detailed lower and/or upper limit content for the at least one polyamide (PA1) (component A) of the previously described polymer compositions; similarly, the content of the second polyamide (PA2') (component B') in these polymer compositions can comply with any above detailed lower and/or upper limit content for the at least one polyamide (PA2) and/or (PA3) (component B) of the previously described polymer compositions. More generally, these polymer compositions can meet any preference or can comply with any particular embodiment as above detailed for the previously described polymer compositions; this applies, among other features, to the nature and the content of the substance (S).

Non limitative examples of these polymer compositions are:
polymer compositions wherein the first polyamide (PA1') is a polyphthalamide as above described (in particular a polyterephthalamide, a poly(tere/iso)phthalamide or a polyisophthalamide as above described), and the second polyamide (PA2') is an aliphatic polyamide as above described;

polymer compositions wherein the first polyamide (PA1') is a polyterephthalamide as above described, and the second polyamide (PA2') is a polyisophthalamide as above described;
polymer compositions wherein the first polyamide (PA1') is a polyterephthalamide as above described, and the second polyamide (PA2') is a poly(tere/iso)phthalamide as above described;
polymer compositions wherein the first polyamide (PA1') is a semi-aromatic polyamide of which more than 50 mole % of the recurring units are obtainable by the polycondensation reaction between an aliphatic diacid comprising at most 6 carbon atoms or derivative thereof and at least one aromatic diamine (such as PMXD6), and the second polyamide (PA2') is a semi-aromatic polyamide of which more than 50 mole % of the recurring units are obtainable by the polycondensation reaction between an aliphatic diacid comprising at least 8 carbon atoms or derivative thereof and at least one aromatic diamine (such as PMXD10).

EXAMPLES

The samples in the following examples were produced by melt extrusion using a laboratory scale 15 cm$^3$ twin-screw extruder operated in recycle mode. The materials were fed to the extruder in powder or pellet form with batches of appr. 18 grams per run. Subsequently, tensile testing bars were injection molded using a coupled 12 cm$^3$ injection molding device.

Extrusion and injection molding conditions were as follows:
Extrusion
Set point barrel temperature: 260° C.
Recorded melt temperature: appr. 245° C.
Screw rotation speed: 250 min$^{-1}$
Residence time: 5 minutes (3 minutes for masterbatch preparation in respective examples containing glass fibres)
Purge gas: nitrogen
Injection molding
Transfer nozzle temperature: 260° C.
Mold temperature: 120° C.
Injection pressure: 500 kPa for two seconds
Holding pressure: 700 kPa for 5 seconds
The tensile mechanical properties were evaluated at 23° C. using a ZWICK apparatus. All samples were measured dry-as-molded (injection-molded samples of the ISO 527-2-IBA geometry). Tensile testing was performed at a rate of 0.5 mm/min, which corresponds to a deformation of approximately 1%/min. For every composition the average of at least three experiments was taken for data analysis. On average 5 tensile bars of the ISO 527-2-IBA geometry were obtained per run.

Examples 1 to 7

Table 1

A composition comprising a semi-aromatic polyamide obtained by the polycondensation of adipic acid and meta-xylylene diamine (hereinafter referred to as PMXD6) and having an intrinsic viscosity of 0.8681 dl/g (measured in a phenol/tetrachloroethane 60/40 (wt/wt) mixture at a temperature of 25° C.) and 10% by weight of standard-viscosity polyamide-66, based on the combined weight of PMXD6 and polyamide-66 and appr. 1 wt. % of talc (based on the combined weight of PMXD6 and polyamide-66) was mixed with various amounts (wt. % based on the total weight of polyamide matrix and additive) of additives (component C)) as indicated in Table 1.

TABLE 1

| Example | Component C) or other | Amount of C) wt. % | Modulus (MPa) | Stress at break (MPa) | Strain at break (%) |
|---|---|---|---|---|---|
| 1C* | none | 0 | 4030 | 98.0 | 7.8 |
| 2 | Zonyl® | 0.5 | 4270 | 91.0 | 26.9 |
| 3 | PEO1 | 0.5 | 4319 | 86.2 | 31 |
| 4 | PEO2 | 0.5 | 4130 | 87.0 | 31.2 |
| 5 | PEO3 | 0.5 | 4100 | 85.5 | 38.0 |
| 6 | Triton | 0.5 | 4060 | 90.5 | 23.5 |
| 7 | TFEO | 0.5 | 4216 | 93.8 | 13.2 |

C* in table 1 and all following tables indicates comparative example

Zonyl® used in example 2 was Zonyl® FSO 100, a fluorosurfactant available from DuPont with a chemical formula $F(CF_2-CF_2)_x-CH_2-CH_2-O-(CH_2-CH_2-O)_yH$ and having an average molecular weight of 725; PEO1 used in Example 3 was a methoxy terminated polyethylene oxide having a number average molecular weight of approximately 500 g/mol available from Sigma-Aldrich Co.

PEO2 used in Example 4 was a medium molecular weight methoxy-terminated poly(ethylene glycol) with a number average molecular weight of appr. 2000 g/mol, available from Sigma-Aldrich Co.;

PEO 3 used in Example 5 was a poly(ethylene glycol) distearate with a number average molecular weight of appr. 930 g/mol, available from Sigma-Aldrich Co.;

TFEO used in Example 7 was a poly(tetrafluoroethylene oxide-co-difluoromethylene oxide)-α,ω-bis(methyl carboxylate) having the structure $CH_3OOCCF_2O(CF_2CF_2O(CF_2CF_2O)_x(CF_2O)_yCF_2COOCH_3$ with a number average molecular weight of appr. 2000 g/mol available from Sigma-Aldrich Co;

Triton X-100 used in Example 6 was an octylphenol ethoxylate having an average ethylene glycol chain length of 9.5. and an average number molecular weight of appr. 625 g/mol, available from DOW Chemical Company.

The results show that the addition of 0.5. wt. % of a compound with alkylene oxide units led to a significant improvement in strain at break without detrimentally influencing the other properties of the composition.

Examples 8 to 14

A composition comprising a semi-aromatic polyamide obtained by the polycondensation of adipic acid and meta-xylylene diamine (hereinafter referred to as PMXD6) and having an intrinsic viscosity of 0.8681 dl/g (measured in a phenol/tetrachloroethane 60/40 (wt/wt) mixture at a temperature of 25° C.) and 10% by weight of standard-viscosity polyamide-66, based on the combined weight of PMXD6 and polyamide-66 and appr. 1 wt. % of talc (based on the combined weight of PMXD6 and polyamide-66) was mixed with various amounts (wt. % based on the total weight of compounds A) to C), of compounds S as indicated in Table 2 or with the other additives indicated for comparison purposes. In Examples 12 to 14 the polyamide matrix contained 30 wt. % of glass fibres (Vetrotex® OCV 983 chopped glass fibres, available from Owens Corning). In these examples the additive Zonyl® was first dispersed in a matrix of the polyamide mixture used in examples 8 to 11 under high shear conditions and subsequently mixed with a respective polyamide mixture containing 50 wt. % glass fibres to target a final glass fibre loading of 30 wt. %.

The mechanical properties were determined as indicated in Examples 1 to 8. Table 2 shows the respective results.

TABLE 2

| Example | Component C or other | Amount of C wt. % | Modulus (MPa) | Stress at break (MPa) | Strain at break (%) |
|---|---|---|---|---|---|
| 8C* | Monarch® | 3.0 | 4395 | 102.4 | 3.1 |
| 9 | Monarch® Zonyl® | 3.0 0.5 | 4388 | 90.4 | 15.9 |
| 10* | N-008-100-P | 3.0 | 4645 | 85 | 2.4 |
| 11 | N-008-100-P Zonyl® | 3.0 0.5 | 4696 | 81.9 | 4.4 |
| 12C* | none | 0 | 9533 | — | 2.3 |
| 13 | Zonyl® | 0.45 | 9826 | — | 2.5 |
| 14 | PEO1 | 0.45 | — | — | 2.6 |

*denotes a comparative example

Monarch® refers to a nanoparticulate carbon black available under the tradename Monarch® 800 from Cabot Corporation, whereas N-008-100-P refers to a graphene material available from Angstron LLC having an average stack thickness of appr. 100 nm and an oxygen content of appr. 0.5 wt. %, and PEO1 and Zonyl® were as used in Examples 1 to 7.

The results of examples 8 to 14 show that the addition of small amounts of a substance containing alkylene oxide units significantly improves the strain at break of the polymer compositions which would not have been expected.

Furthermore, the addition of component C) led to a slight increase in the notched Izod impact strength in the order of up to 10% (data not shown in detail).

Examples 15 to 21

A composition comprising a semi-aromatic polyamide obtained by the polycondensation of adipic acid and meta-xylylene diamine (hereinafter referred to as PMXD6) and having an intrinsic viscosity of 0.8681 dl/g (measured in a phenol/tetrachloroethane 60/40 (wt/wt) mixture at a temperature of 25° C.) and 10% by weight of standard-viscosity polyamide-66, based on the combined weight of PMXD6 and polyamide-66 and appr. 1 wt. % of talc (based on the combined weight of PMXD6 and polyamide-66) was mixed with various amounts (wt. % based on the total weight of compounds A) to C)) of a poly(ethylene oxide) having a number average molecular weight of appr. 200,000 (hereinafter referred to as PEO4) to analyze the influence of the content of substance (S). Test specimens were prepared as in Examples 1 to 7 and the results are shown in Table 3.

TABLE 3

| Example | Component C | Amount of C wt. % | Modulus (MPa) | Stress at break (MPa) | Strain at break (%) |
|---|---|---|---|---|---|
| 15C* | none | 0 | 4148 | 116 | 4.25 |
| 16 | PEO4 | 0.5 | 4001 | 74.8 | 15.0 |
| 17 | PEO4 | 1.0 | 4121 | 70.8 | 36.2 |
| 18 | PEO4 | 2.0 | 4072 | 79.9 | 43.1 |
| 19 | PEO4 | 3.0 | 4055 | 80.4 | 64.3 |
| 20 | PEO4 | 5.0 | 3894 | 68.1 | 56.7 |
| 21 | PEO4 | 10.0 | 3693 | 63.3 | 27.4 |

The results of Examples 15 to 21 show a slight decrease in the modulus and also a decrease in the stress at break, the latter being almost independent of PEO loading whereas the decrease in modulus was more expressed at higher PEO loads. Increasing the PEO loading from 0.5 to 3 wt % has a profound beneficial effect in strain at break, the maximum achieved with a PEO loading of 3%. Further increasing the PEO load is detrimental albeit the value with even 10% loading of PEO is still much better than for the composition without PEO. Overall a PEO loading of appr. 3 wt % seems to offer the best spectrum of properties, i.e. highest strain at break with only moderate reduction of modulus.

Examples 22 to 27

A composition comprising a semi-aromatic polyamide obtained by the polycondensation of adipic acid and meta-xylylene diamine (hereinafter referred to as PMXD6) and having an intrinsic viscosity of 0.8681 dl/g (measured in a phenol/tetrachloroethane 60/40 (wt/wt) mixture at a temperature of 25° C.) and 10% by weight of standard-viscosity polyamide-66, polyamide-11 (poly(11-amino-undecano amide) or polyamide-12 (poly(omega-lauryllactam) the latter two available as Rilsan® from Arkema, based on the combined weight of PMXD6 and aliphatic polyamide, and appr. 1 wt. % of talc (based on the combined weight of PMXD6 and polyamide-66) was mixed with 3 wt. %, based on the total weight of compounds A) to C), of a poly(ethylene oxide) having a number average molecular weight of appr. 200,000 (hereinafter referred to as PEO4). Test specimens were prepared as in examples 1 to 7 and the results are shown in Table 4.

TABLE 4

| Example | Aliphatic Polyamide | Amount of PEO in wt. % | Modulus (MPa) | Stress at break (MPa) | Strain at break (%) |
|---|---|---|---|---|---|
| 22C* | PA-66 | 0 | 3603 | 97.7 | 3.2 |
| 23 | PA-66 | 3.0 | 3676 | 71.5 | 14.3 |
| 24C* | PA-11 | 0 | 4052 | 109.7 | 6.5 |
| 25 | PA-11 | 3.0 | 3442 | 87.9 | 10.5 |
| 26C* | PA-12 | 0 | 3656 | 100.4 | 3.6 |
| 27 | PA-12 | 3.0 | 3683 | 81.7 | 9.6 |

The results of Examples 22 to 27 show that the beneficial effect of PEO on strain at break while decreasing modulus only slightly if at all is independent from the aliphatic polyamide used in the compositions.

Comparative Examples 28 to 29

A semi-aromatic polyamide obtained by the polycondensation of adipic acid and meta-xylylene diamine (hereinafter referred to as PMXD6) and having an intrinsic viscosity of 0.8681 dl/g (measured in a phenol/tetrachloroethane 60/40 (wt/wt) mixture at a temperature of 25° C.) and appr. 1 wt. % of talc was mixed with 3 wt. %, based on the total weight of compounds A) and C), of a poly(ethylene oxide) having a number average molecular weight of appr. 200,000 (hereinafter referred to as PEO4). Test specimens were prepared as in examples 1 to 7 and the results are shown in Table 5.

TABLE 5

| Example | Amount of PEO in wt. % | Modulus (MPa) | Stress at break (MPa) | Strain at break (%) |
|---|---|---|---|---|
| 28C* | 0 | 3330 | 83.3 | 2.8 |
| 29C* | 3.0 | 3430 | 61.7 | 3.9 |

Comparative examples 28 and 29 show that the beneficial effect of PEO on strain at break is not achieved with a semi-aromatic polyamide alone, i.e. without addition of an aliphatic polyamide.

Examples 30 to 33

A composition containing a semi-aromatic polyamide obtained by the polycondensation of adipic acid and meta-xylylene diamine (hereinafter referred to as PMXD6) and having an intrinsic viscosity of 0.8681 dl/g (measured in a phenol/tetrachloroethane 60/40 (wt/wt) mixture at a temperature of 25° C.) and 10% by weight of standard-viscosity polyamide-66, based on the combined weight of PMXD6 and polyamide-66 and appr. 1 wt. % of talc (based on the combined weight of PMXD6 and polyamide-66) was mixed with various amounts (wt. % based on the total weight of compounds A) to C) of a poly(ethylene oxide) having a number average molecular weight of appr. 200,000 (PEO4). The polyamide matrix contained 30 wt. % of glass fibres (Vetrotex® OCV 983 chopped glass fibres, available from Owens Corning). In these examples the PEO was first dispersed in a matrix of the polyamide mixture under high shear conditions and subsequently mixed with a respective polyamide mixture containing 50 wt. % glass fibres to target a final glass fibre loading of 30 wt. %. Test specimens were prepared as in examples 1 to 7 and the results are shown in Table 6.

TABLE 6

| Example | Amount of PEO in wt. % | Modulus (MPa) | Stress at break (MPa) | Strain at break (%) |
|---|---|---|---|---|
| 30C* | 0 | 9677 | 165.9 | 2.0 |
| 31 | 3.0 (2.1) | 10280 | 163.6 | 2.6 |
| 32 | 5 (3.5) | 10009 | 155.5 | 3.1 |
| 33 | 10.0 (7.0) | 9268 | 144.3 | 3.0 |

Percentages in parentheses give the PEO loading based on the total weight of the composition (including glass fibres)

The results of Examples 30 to 33 show an improvement in strain at break of from 30 to 50% while substantially maintaining stress at break and modulus. PEO loadings significantly exceeding 3.5%, based on the total weight (including glass fibres) or 5 wt % (based on the weight of the polyamide composition without glass fibres) do not yield a further improvement of strain at break while modulus and stress at break are reduced. Thus, it appears that loadings of component C) of up to 3.5%, based on the total weight of the composition provide the best spectrum of properties for glass fibre reinforced compositions.

Examples 34 to 39

A composition containing a semi-aromatic polyamide obtained by the polycondensation of adipic acid and meta-xylylene diamine (hereinafter referred to as PMXD6) and having an intrinsic viscosity of 0.8681 dl/g (measured in a phenol/tetrachloroethane 60/40 (wt/wt) mixture at a temperature of 25° C.) and 10% by weight of standard-viscosity polyamide-66, based on the combined weight of PMXD6 and polyamide-66 and appr. 1 wt. % of talc (based on the combined weight of PMXD6 and polyamide-66) was mixed with 3 wt. %, based on the weight of the compositions, of various carbon based fillers and poly(ethylene glycol) having an average number molecular weight of appr. 200,000 (PEO4) in accordance with table 7. Test specimens were prepared as in Examples 1 to 7 and the tensile properties were determined as described before but at a rate of 5 mm/min. The results are given in table 7.

TABLE 7

| Example | Filler | Amount of PEO in wt. % | Modulus (MPa) | Stress at break (MPa) | Strain at break (%) |
|---|---|---|---|---|---|
| 34C* | HC-Carbon | 0 | 4776 | 106.1 | 3.2 |
| 35 | HC-Carbon | 0.5 | 4879 | 87.5 | 10.5 |
| 36C* | N-006-10-01 | 0 | 4927 | 94.5 | 2.4 |
| 37 | N-006-10-01 | 1.0 | 4848 | 83.7 | 6.4 |
| 38C* | XG5 | 0 | 4924 | 105.6 | 2.8 |
| 39 | XG5 | 1.0 | 4919 | 91.5 | 4.8 |

HC-Carbon represents carbon graphite produced by ultrashear technology and available from HC Carbon GmbH under the tradename Mechano-Lube2®, N-006-10-01 represents nanographene platelets having an average stack thickness of appr. 10 nm and an oxygen content of appr. 0.1%, available from Angstron LLC XG5 represents graphene nanoplatelets with a stack thickness of appr. 10 nm and a lateral size of appr. 5 micrometers, available from XG Sciences.

It has to be noted here that the products of Examples 36 to 39 have been produced on a regular 26 mm twin screw extruder (ZSK-26 from Coperion Werner & Pfleiderer)) which differs from the extruder used in the other examples. However, the processing conditions in each of examples 36 to 39 were identical, so that the results are suitable to show the effect of the PEO additive in the compositions but should not be directly compared with the other examples.

The results of examples 34 to 39 show, that small amounts of poly(ethylene oxide) significantly improve strain at break while only slightly decreasing stress at break and modulus. Conventional graphite fillers seem to show a comparable behaviour as nanographene platelets.

Examples 40 to 44

These examples show the dependency of certain properties of the products in accordance with the invention on the molecular weight of a polyalkylene oxide as component C).

A composition containing a semi-aromatic polyamide obtained by the polycondensation of adipic acid and meta-xylylene diamine (hereinafter referred to as PMXD6) and having an intrinsic viscosity of 0.8681 dl/g (measured in a phenol/tetrachloroethane 60/40 (wt/wt) mixture at a temperature of 25° C.) and 10% by weight of standard-viscosity polyamide-66, based on the combined weight of PMXD6 and polyamide-66 and appr. 1 wt. % of talc (based on the combined weight of PMXD6 and polyamide-66) was mixed with 0.5 wt. %, based on the weight of the compositions, of poly(ethylene oxide having different average number molecular weights in accordance with table 8. Test specimens were prepared as in Examples 1 to 7 and the tensile properties were determined as described. The results are given in table 8.

TABLE 8

| Example | MW PEO (Number average) | Modulus (MPa) | Yield stress (MPa) | Strain at break (%) |
|---|---|---|---|---|
| 40C | — | 4148 | 117.1 | 3.45 |
| 41 | 2,000 | 4008 | 100.8 | 4.66 |
| 42 | 200,000 | 4001 | 103.1 | 8.62 |
| 43 | 1,000,000 | 4071 | 101.5 | 15.72 |
| 44 | 8,000,000 | 4198 | 101.1 | 14.51 |

The results show an improvement of strain at break with increasing number average molecular weight of the polyethylene oxide used, an optimum being obtained at a MW of appr. 1,000,000.

The data of the foregoing examples 1 to 44 illustrate the benefit of the substances S in accordance with the instant invention in compositions comprising a semi-aromatic polyamide, a second polyamide and, optionally, fillers. A fair retention of the modulus is accompanied by a significant improvement in strain at break, imparting both mechanical reinforcement and ductility at the same time. New application opportunities of the known rather brittle semi-aromatic polyamides can be foreseen with the compositions in accordance with the instant invention.

The invention claimed is:

1. A polymer composition, comprising:
   A) at least 10 wt. %, based on the combined weight of components A) and B), of at least one semi-aromatic polyamide (PA1) of which more than 50 mole % of the recurring units are obtained by a polycondensation reaction between at least one non-aromatic diacid or derivative thereof and at least one aromatic diamine;
   B) at least one polyamide selected from the group consisting of (i) semi-aromatic polyamides (PA2) of which more than 50 mole % of the recurring units are obtained by the polycondensation reaction between at least one aromatic diacid or derivative thereof and at least one non-aromatic diamine; (ii) aliphatic polyamides (PA3) of which more than 50 mole % of the recurring units are obtained by a polycondensation reaction between an aliphatic diacid and an aliphatic diamine, and/or by an auto-polycondensation reaction of at least one of an amino carboxylic acid and a lactam; and mixtures thereof; and
   C) at least 0.01 wt. %, based on the combined weight of components A) to C) of at least one alkylene oxide-containing organic substance (S), said substance (S) containing at least two alkylene oxides moieties of general formula

—O-A- wherein A in said general formula is a $C_2$-$C_{10}$ alkylene group
   and wherein said substance (S) differs from polymers comprising repeating units obtained by a polycondensation reaction of a diamine and a diacid and/or by an auto-polycondensation reaction of an amino-acid.

2. A polymer composition, comprising:
   A) at least 10 wt. %, based on the combined weight of components A) and B), of at least one semi-aromatic polyamide (PA1) of which more than 50 mole % of the recurring units are obtained by a polycondensation reaction between at least one non-aromatic diacid or derivative thereof and at least one aromatic diamine;
   B) at least one polyamide selected from the group consisting of
      (i) semi-aromatic polyamides (PA2) of which more than 50 mole % of the recurring units are obtained by a polycondensation reaction between at least one aromatic diacid or derivative thereof and at least one non-aromatic diamine; (ii) aliphatic polyamides (PA3) of which more than 50 mole % of the recurring units are obtained by a polycondensation reaction between an aliphatic diacid and an aliphatic diamine, and/or by an auto-polycondensation reaction of at least one of an amino carboxylic acid and a lactam; and mixtures thereof; and
   C) at least 0.01 wt. %, based on the combined weight of components A) to C), of a substance (S), wherein said substance (S) differs from polymers comprising repeating units obtained by a polycondensation reaction of a diamine and a diacid and/or by an auto-polycondensation reaction of an amino-acid and said substance (S) is selected from the group consisting of poly(alkylene oxide)s, alkoxylated acyclic carboxylic acids, alkoxylated acyclic carboxylic acid esters, alkoxylated acyclic carboxylic acid metal salts, alkoxylated acyclic partially fluorinated carboxylic acids, alkoxylated perfluorinated carboxylic acids, alkoxylated acyclic alcohols, alkoxylated partially fluorinated acyclic alcohols, alkoxylated acyclic perfluoroalcohols, alkoxylated alkyl phenols, alkoxylated acyclic amines, alkoxylated partially fluorinated acyclic amines, alkoxylated acyclic perfluoroamines, alkoxylated acyclic amides, alkoxylated alkyl sulfates, alkoxylated partially fluorinated alkyl sulfates, alkoxylated perfluorinated alkyl sulfates, alkoxylated alkyl sulfonates, alkoxylated partially fluorinated alkyl sulfonates, alkoxylated perfluorinated alkyl sulfonates, alkoxylated alkylaryl sulfonates, alkoxylated mono- or dialkyl sulfosuccinates and sulfosuccinamates, and alkoxylated alkyl or alkylaryl phosphates; or wherein said substance (S) is an anionic or cationic emulsifier consisting essentially of at least one hydrophilic first block and at least one lipophilic further block.

3. The polymer composition in accordance with claim 2, wherein said substance (S) contains at least two alkylene oxides moieties of general formula:

wherein A in said general formula is a $C_2$-$C_{10}$ alkylene group.

4. The polymer composition in accordance with claim 1,
wherein the aromatic diamine is selected from m-phenylene diamine (MPD), p-phenylene diamine (PPD), 3,4'-diaminodiphenyl ether (3,4'-ODA), 4,4'-diaminodiphenyl ether (4,4'-ODA), and m-xylylenediamine (MXDA), and wherein the non-aromatic diacid is selected from the group consisting of oxalic acid (HOOC—COOH), malonic acid (HOOC—CH$_2$—COOH), succinic acid [HOOC—(CH$_2$)$_2$—COOH], glutaric acid [HOOC—(CH$_2$)$_3$—COOH], 2,2-dimethyl-glutaric acid [HOOC—C(CH$_3$)$_2$—(CH$_2$)$_2$—COOH], adipic acid [HOOC—(CH$_2$)$_4$—COOH], 2,4,4-trimethyl-adipic acid [HOOC—CH(CH$_3$)—CH$_2$—C(CH$_3$)$_2$—CH$_2$—COOH], pimelic acid [HOOC—(CH$_2$)$_5$—COOH], suberic acid [HOOC—(CH$_2$)$_6$—COOH], azelaic acid [HOOC—(CH$_2$)$_7$—COOH], sebacic acid [HOOC—(CH$_2$)$_8$—COOH], undecanedioic acid [HOOC—(CH$_2$)$_9$—COOH], dodecanedioic acid [HOOC—(CH$_2$)$_{10}$—COOH], and tetradecanedioic acid [HOOC—(CH$_2$)$_{12}$—COOH].

5. A polymer composition, comprising:
A') at least 10 wt. %, based on the combined weight of components A') and B'), of a first polyamide (PA1');
B') a second polyamide (PA2'); and
C') at least 0.01 wt. %, based on the combined weight of components A') to C') of at least one alkylene oxide-containing organic substance (S), said substance (S) differing from polymers comprising repeating units obtained by a polycondensation reaction of a diamine and a diacid and/or by an auto-polycondensation reaction of an amino-acid and said substance (S) containing at least two alkylene oxides moieties of general formula:

wherein A in said general formula is a $C_2$-$C_{10}$ alkylene group, wherein at least part of the recurring units of the first polyamide (PA1') and of the second polyamide (PA2') differ from each other.

6. The polymer composition in accordance with claim 5, wherein more than 30 mole % of the recurring units of the first polyamide (PA1') and of the second polyamide (PA2') differ from each other.

7. The polymer composition in accordance with claim 6, wherein more than 70 mole % of the recurring units of the first polyamide (PA1') and of the second polyamide (PA2') differ from each other.

8. The polymer composition in accordance with claim 7, wherein essentially all the recurring units of the first polyamide (PA1') and of the second polyamide (PA2') differ from each other.

9. The polymer composition in accordance with claim 1, wherein said compound (S) is selected from the group consisting of poly(alkylene oxides), which optionally contain fluorine.

10. The polymer composition in accordance with claim 9, wherein said substance (S) is selected from the group of fluorosurfactants of the general structure:

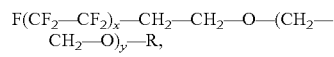

wherein R is H or an alkoxy group, and
wherein x and y have a value in the range of from 1 to 50.

11. The polymer composition in accordance with claim 5, wherein the substance (S) is selected from the group consisting of poly(alkylene oxides), which optionally contain fluorine.

12. The polymer composition in accordance with claim 11, wherein the substance (S) is selected from the group of fluorosurfactants of the general structure:

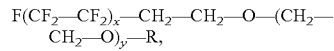

wherein R is H or an alkoxy group, and
wherein x and y have a value in the range of from 1 to 50.

13. The polymer composition in accordance with claim 5, wherein the substance (S) is selected from the group consisting of alkoxylated acyclic carboxylic acids, alkoxylated acyclic carboxylic acid esters, alkoxylated acyclic carboxylic acid metal salts, alkoxylated acyclic partially fluorinated carboxylic acids, alkoxylated perfluorinated carboxylic acids, alkoxylated acyclic alcohols, alkoxylated partially fluorinated acyclic alcohols, alkoxylated acyclic perfluoroalcohols, alkoxylated alkyl phenols, alkoxylated acyclic amines, alkoxylated partially fluorinated acyclic amines, alkoxylated acyclic perfluoroamines, alkoxylated acyclic amides, alkoxylated alkyl sulfates, alkoxylated partially fluorinated alkyl sulfates, alkoxylated perfluorinated alkyl sulfates, alkoxylated alkyl sulfonates, alkoxylated partially fluorinated alkyl sulfonates, alkoxylated perfluorinated alkyl sulfonates, alkoxylated alkylaryl sulfonates, alkoxylated mono- or dialkyl sulfosuccinates and sulfosuccinamates, and alkoxylated alkyl or alkylaryl phosphates.

14. The polymer composition in accordance with claim 5, wherein the substance (S) is an anionic or cationic emulsifier consisting essentially of at least one hydrophilic first block and at least one lipophilic further block.

15. The polymer composition in accordance with claim 5, wherein the substance (S) is free of any functional secondary amide groups.

16. The polymer composition in accordance with claim 5, wherein the substance (S) is free of any functional primary, secondary or tertiary amide groups.

17. The polymer composition in accordance with claim 16, wherein the substance (S) is free of any primary, secondary or tertiary urethane functional groups.

18. The polymer composition in accordance with claim 17, wherein the substance (S) is free of any primary, secondary or tertiary amidine functional groups.

19. The polymer composition in accordance with claim 5, wherein the substance (S) is a polymer essentially consisting of a repeating unit represented by formula —$R^1$—O— wherein $R^1$ represents a divalent alkylene group having from 2 to 8 carbon atoms as sole repeating unit, and having a hydroxyl group at the terminals thereof which is optionally partially or fully substituted by alkoxide groups.

20. The polymer composition in accordance with claim 5, wherein the substance (S) is a non ionic emulsifier selected from the group consisting of (i) alkoxylated fatty carboxylic acids having seven or more carbon atoms, (ii) alkoxylated fatty alcohols having seven or more carbon atoms and (iii) alkoxylated fatty amines having seven or more carbon atoms, or is an anionic emulsifier which is a condensation product of from 2 to 50 moles of an alkylene oxide with a mole of a compound selected from the group consisting of (i) alkali metal or ammonium alkyl sulfates, (ii) alkali metal or ammonium alkyl sulfonates, (iii) alkali metal or ammonium alkylaryl sulfonates, (iv) alkali metal or ammonium sulfosuccinates and (v) alkali metal or ammonium phosphates.

\* \* \* \* \*